(12) United States Patent
Kung

(10) Patent No.: US 8,248,035 B2
(45) Date of Patent: Aug. 21, 2012

(54) VOLTAGE CONVERTING APPARATUS

(75) Inventor: Fan-Chin Kung, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 308 days.

(21) Appl. No.: 12/764,064

(22) Filed: Apr. 20, 2010

(65) Prior Publication Data

US 2011/0234172 A1    Sep. 29, 2011

(30) Foreign Application Priority Data

Mar. 23, 2010  (CN) .......................... 2010 1 0131006

(51) Int. Cl.
*H02J 7/00* (2006.01)

(52) U.S. Cl. .......................... 320/137; 320/111; 320/114

(58) Field of Classification Search .................... 320/137
See application file for complete search history.

(56) References Cited

U.S. PATENT DOCUMENTS

| | | | | |
|---|---|---|---|---|
| 5,903,131 | A * | 5/1999 | Sekine et al. ................. | 320/106 |
| 6,028,415 | A * | 2/2000 | Nagai et al. .................... | 320/162 |
| 6,498,460 | B1 * | 12/2002 | Atkinson ....................... | 320/135 |
| 6,597,153 | B1 * | 7/2003 | Bucur .......................... | 320/128 |
| 7,688,046 | B2 * | 3/2010 | Li et al. ......................... | 323/266 |
| 8,143,923 | B2 * | 3/2012 | Ball .............................. | 327/103 |
| 2002/0027786 | A1 * | 3/2002 | Nakazawa et al. ......... | 363/21.05 |
| 2003/0126474 | A1 * | 7/2003 | Sawyers et al. ............... | 713/300 |
| 2006/0103996 | A1 * | 5/2006 | Carroll et al. .................... | 361/90 |
| 2006/0174143 | A1 * | 8/2006 | Sawyers et al. ............... | 713/300 |
| 2006/0192530 | A1 * | 8/2006 | Nguyen ........................ | 320/128 |
| 2007/0216353 | A1 * | 9/2007 | Fischer et al. ................. | 320/115 |
| 2009/0160500 | A1 * | 6/2009 | Niculae et al. ................ | 327/109 |
| 2010/0077237 | A1 * | 3/2010 | Sawyers ........................ | 713/300 |
| 2011/0270549 | A1 * | 11/2011 | Jeansonne et al. .............. | 702/60 |

* cited by examiner

*Primary Examiner* — Arun Williams
(74) *Attorney, Agent, or Firm* — Altis Law Group, Inc.

(57) ABSTRACT

A voltage converting apparatus includes a sense resistor to sense a voltage from an adapter, some power switches to set power rating of the adapter, and a comparator to compare a received voltage from the adapter with a voltage corresponding to the power rating. The comparator controls a first control switch connected between the sense resistor and a charging circuit to close when the adapter is at a little traffic state, and controls the first control switch to open when the adapter is at a fully loaded state. A voltage converter converts the received voltage from the adapter when the first control switch is closed. An output interface provides a voltage of the adapter to an electronic device. Some output ports connected to the voltage converter to provide a converted voltage of the voltage converter to electronic devices connected to the output ports.

8 Claims, 2 Drawing Sheets

VOLTAGE CONVERTING APPARATUS

BACKGROUND

1. Technical Field

The present disclosure relates to voltage converting apparatuses, and particularly, to a voltage converting apparatus connecting an adapter to a portable electronic device.

2. Description of Related Art

Travelers, particularly business travelers, commonly take many electronic devices with them. These devices may include one or more computers, PDA's, cameras, audio recorders, projectors and many other possibilities. Usually, the traveler's computer, such as a notebook computer, may not have enough universal serial bus (USB) interfaces to accommodate all of their USB devices at once necessitating frequent plugging and unplugging of devices to and from the notebook computer. Additionally, for those devices that are not USB devices, separate chargers must be brought along for each one of them. All this is very inconvenient to the traveler, or even to someone in their own home.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
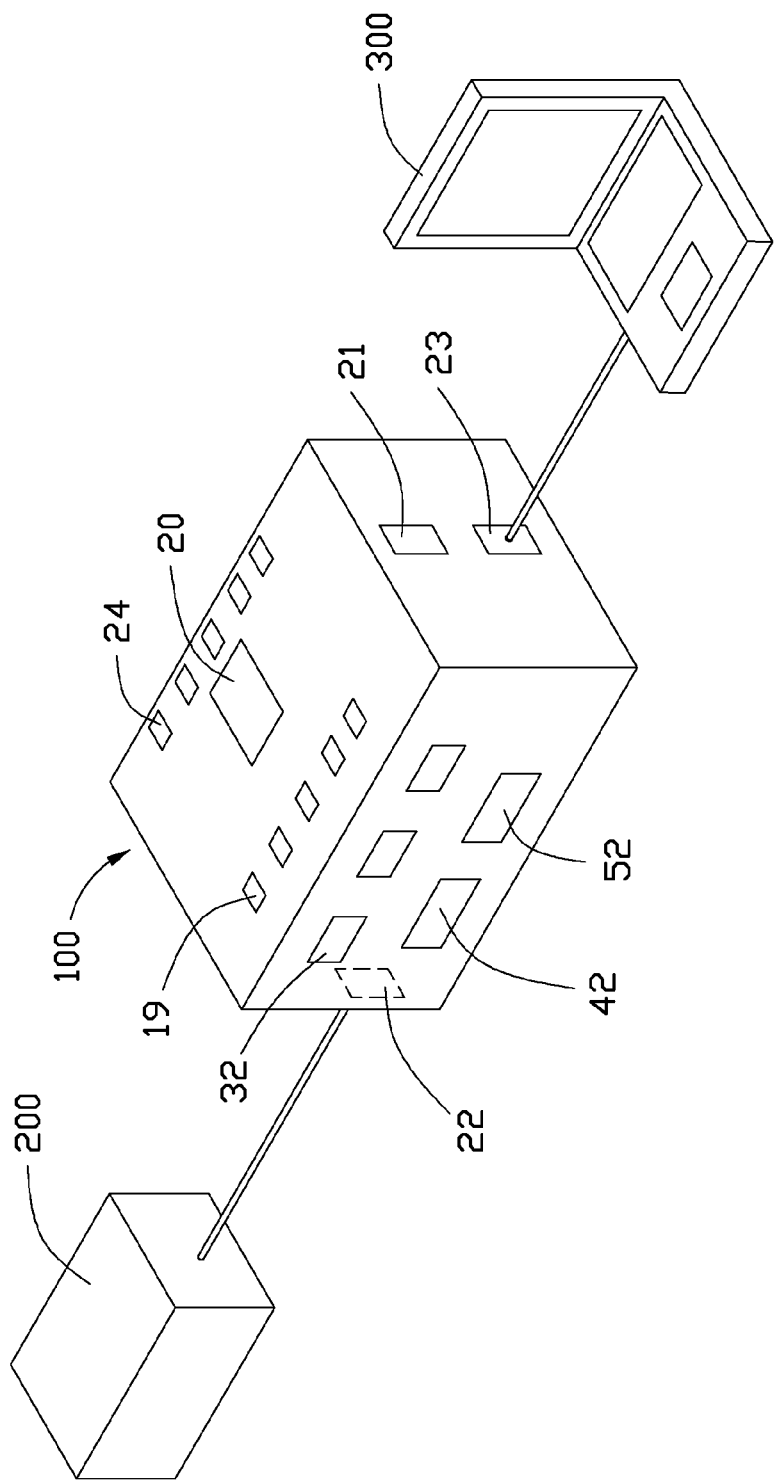
FIG. 1 is a schematic view of a voltage converting apparatus in accordance with an exemplary embodiment of the present disclosure, the voltage converting apparatus is connected between an adapter and a notebook.
Figure 2:
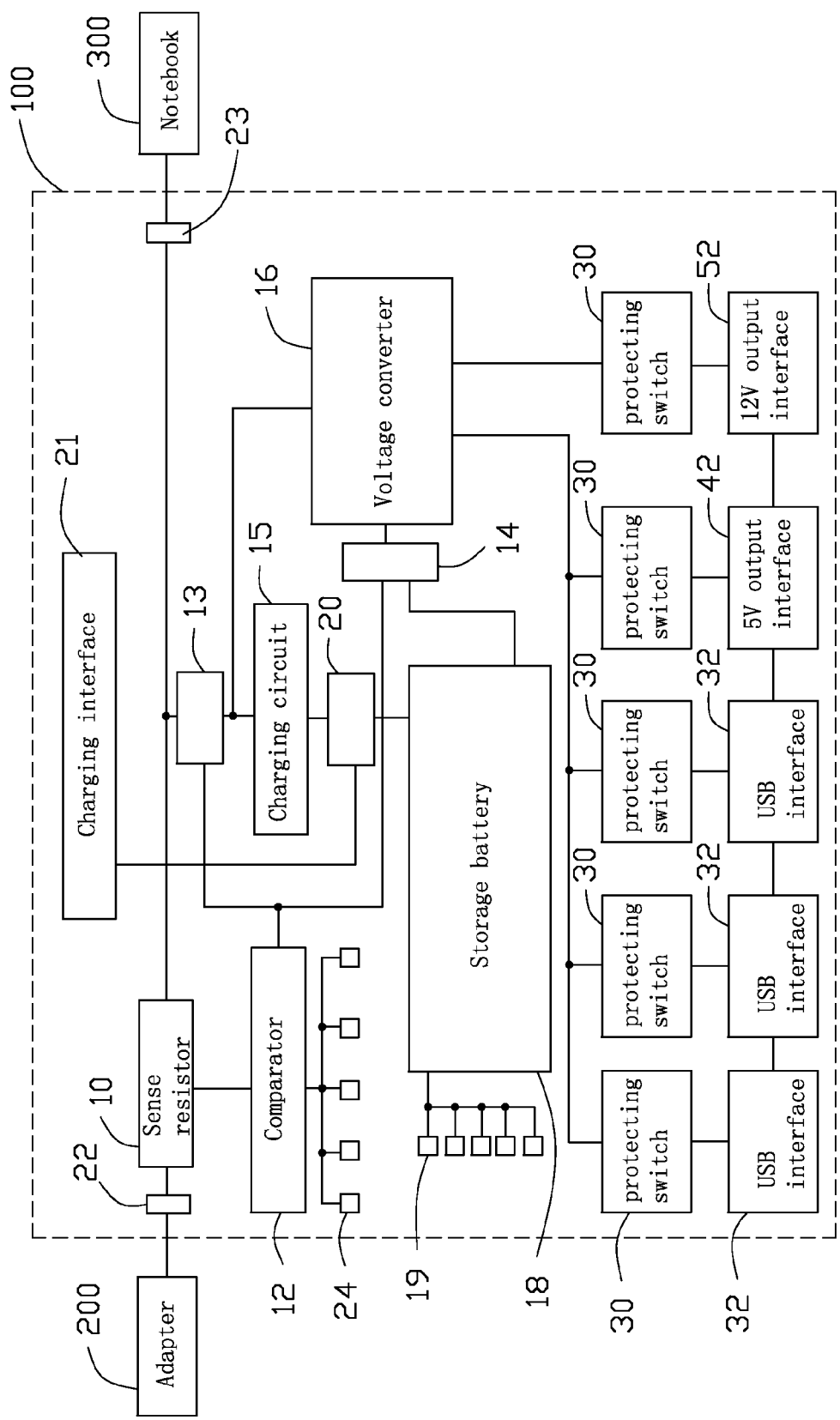
FIG. 2 is a block diagram of FIG. 1.

Referring to FIGS. 1 and 2, a voltage converting apparatus is connected between an adapter 200 and a portable electronic device, such as a notebook 300. The voltage converting apparatus is a universal adapter connected between a primary device such as a notebook computer and a power source allowing a user to plug in many USB devices for charging and other electronic devices that do not use USB connections, so that power can be provided at once and conveniently to the user for all their electronic devices. The voltage converting apparatus in accordance with an embodiment includes a main body 100, a sense resistor 10, a comparator 12, control switches 13 and 14, a charging circuit 15, a voltage converter 16, a storage battery 18, a plurality of indicators 19, a button switch 20, an input interface 22, an output interface 23, a plurality of power switches 24, a plurality of protecting switches 30, and a plurality of output ports. In one embodiment, the plurality of output ports includes three USB interfaces 32, a 5 volt (V) output interface 42, a 12V output interface 52, and a charging interface 21.

The voltage converter 16 may be a direct current (DC) voltage converter. The number of the plurality of indicators 19 is five, to indicate five different power states of the storage battery 18. For example, the five indicators 19 respectively represent the charge of the storage battery 18 when it is about 10%, 20%, 30%, 40%, and 50% charged. When the charge of the storage battery 18 is about 20%, the indicator 19 corresponding to 20% charge remaining, is turned on. The plurality of protecting switches 30 are resettable fuses. The number of the plurality of power switches 24 is five; all power switches 24 are connected to the comparator 12. Each power switch 24 is configured to set the power rating of the comparator according to the power rating of an adapter 200, such as 30 watts (W), 60 W, 90 W, 120 W, or 150 W. The comparator 12 is set to receive the voltage corresponding to the selected power rating of the adapter 200 through pressing a corresponding power switch 24. The comparator 12 receives an actual voltage from the adapter 200 via the sense resistor 10 and compares the received actual voltage of the adapter 200 with the voltage corresponding to the selected power rating, to determine whether the adapter 200 can provide voltages to the voltage converting apparatus. The charging circuit 15 is configured to charge the storage battery 18. The input interface 22, three USB interfaces 32, the 5V output interface 42, the 12V output interface 52, the output interface 23, the charging interface 21, the indicators 19, the power switches 24, and the button switch 20 are set on surfaces of the main body 100, and the locations can be designed according to need.

The input interface 22 is connected to the sense resistor 10 and connected to the adapter 200 via a cable. The comparator 12 is connected to the sense resistor 10, to receive a voltage from the adapter 200 via the sense resistor 10. The sense resistor 10 is also connected to the output interface 23. The output interface 23 is connected to the notebook 300 via a cable, to provide the voltage of the adapter 200 to the notebook 300. The power switches 24 are all connected to the comparator 12, to set the power rating of the adapter 200. The comparator 12 compares the received voltage from the adapter 200 through the sense resistor 10 with the voltage corresponding to the corresponding power rating. When the received voltage is less than the voltage corresponding to the power rating, the adapter 200 is at a little traffic state. When the received voltage is equal to the voltage corresponding to the power rating, the adapter 200 is at a fully loaded state. An output terminal of the comparator 12 is connected to control terminals of the control switches 13 and 14. A first terminal of the control switch 13 is connected to the sense resistor 10. A second terminal of the control switch 13 is connected to an input terminal of the charging circuit 15 and a first input terminal of the voltage converter 16. The charging circuit 15 and the voltage converter 16 receive the voltage from the adapter 200 when the first terminal of the control switch 13 is connected to the second terminal of the control switch 13. The voltage converter 16 converts the received voltage from the adapter 200 into a 12V output and a 5V output.

The button switch 20 is connected to an output terminal of the charging circuit 15, an input terminal of the storage battery 18, and the charging interface 21. When the button switch 20 is pressed, the charging circuit 15 charges an electronic device, which is connected to the charging interface 21 and charges the storage battery 18. The indicators 19 are all connected to the storage battery 18, to indicate the charge of the storage battery 18. A first terminal of the control switch 14 is connected to a second input terminal of the voltage converter 16. A second terminal of the control switch 14 is connected to the storage battery 18. The voltage converter 16 receives a voltage from the storage battery 18 and converts the received voltage from the storage battery 18 into a 12V output and a 5V output when the first terminal of the control switch 14 is connected to the second terminal of the control switch 14. Output terminals of the voltage converter 16 are connected to the protecting switches 30. The protecting switches 30 are respectively connected to the USB interfaces 32, the 5V output interface 42, and the 12V output interface 52. The voltage converter 16 outputs the 5V output to the electronic devices which are connected to the USB interfaces 32 and the 5V output interface 42, and outputs the 12V output to the 12V output interface 52. The protecting switches 30 are cut off when the converted voltages of the voltage converter 16 are in an overvoltage state, to prevent the converted voltages of the voltage converter 16 from damaging the corresponding electronic devices.

In use, when the adapter 200 is connected to an alternating current (AC) power, a power switch 24 is selected according to the power rating of the adapter 200. The sense resistor 10 senses the voltage from the adapter 200 via the input interface 22, and outputs the voltage from the adapter 200 to the notebook 300 and the comparator 12. The comparator 12 compares the received voltage from the adapter 200 with the voltage corresponding to the power rating, when the received voltage is less than the voltage corresponding to the power rating, namely, the adapter 200 is at a little traffic state, the comparator 12 controls the first terminal of the control switch 13 to connect to the second terminal of the control switch 13 and controls the first terminal of the control switch 14 to disconnect to the second terminal of the control switch 14, when the button switch 20 is pressed, the charging circuit 15 charges the electronic device, which is connected to the charging interface 21, and charges the storage battery 18. The voltage converter 16 converts the received voltage from the adapter 200 into a 5V output and a 12V output, and provides the 5V output to the electronic devices, which are connected to the USB interfaces 32 and the 5V output interface 42 via the corresponding protecting switches 30. The voltage converter 16 provides the 12V output to the electronic device, which is connected to the 12V output interface 52 via the corresponding protecting switch 30. The protecting switches 30 are cut off when the converted voltages from the voltage converter 16 are in an overvoltage state, to prevent the converted voltages of the voltage converter 16 from damaging the electronic devices.

When the voltage received by the comparator 12 from the adapter 200 is equal to the voltage corresponding to the power rating, namely, the adapter 200 is at a fully loaded state, the comparator 12 controls the first terminal of the control switch 13 to disconnect to the second terminal of the control switch 13 and controls the first terminal of the control switch 14 to connect to the second terminal of the control switch 14, the charging circuit 15 does not receive input voltage, thus the charging circuit 15 does not charge the electronic device, which is connected to the charging interface 21, and does not charge the storage battery 18. At the same time, the storage battery 18 discharges, the voltage converter 16 receives the voltage from the storage battery 18 and converts the received voltage into a 5V output and a 12V output, and provides the 5V output to the electronic devices, which are connected to the USB interfaces 32 and the 5V output interface 42 via the corresponding protecting switches 30. The voltage converter 16 provides the 12V output to the electronic device, which is connected to the 12V output interface 52 via the corresponding protecting switch 30. The protecting switches 30 are cut off when the converted voltages from the voltage converter 16 are in an overvoltage state, to prevent the converted voltages of the voltage converter 16 from damaging the electronic devices.

When the adapter 200 is disconnected to the AC power, the storage battery 18 continuingly discharges, the voltage converter 16 receives the voltage from the storage battery 18 and converts the received voltage into a 5V output and a 12V output, and provides the 5V output to the electronic devices, which are connected to the USB interfaces 32 and the 5V output interface 42 via the corresponding protecting switches 30. The voltage converter 16 provides the 12V output to the electronic device, which is connected to the 12V output interface 52 via the corresponding protecting switch 30. Therefore, when the adapter 200 is disconnected to the AC power, the electronic devices are connected to the USB interfaces 32, the 5V voltage interface 42, and the 12V voltage interface 52 can work for a time through discharging of the storage battery 18, to avoid data transmitting interrupt.

The voltage converting apparatus can provide voltages to the notebook 300 and charge the electronic devices, provide a number of USB interfaces to satisfy requirement of the notebook 300, and provide different voltage interfaces to satisfy different requirements of voltages.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A voltage converting apparatus, comprising:
  an input interface to be connected to an adapter;
  a sense resistor connected to the input interface, to sense a voltage from the adapter;
  a plurality of power switches, to set the power rating of the adapter connected to the input interface;
  a comparator connected to the sense resistor, to receive a voltage from the adapter via the sense resistor, the comparator also connected to the plurality of power switches, to receive the voltage corresponding to the power rating of the adapter through setting one of the plurality of power switches, the comparator comparing the received voltage from the adapter with the voltage corresponding to the power rating and outputting a control signal;
  a first control switch comprising a control terminal connected to an output terminal of the comparator, a first terminal connected to the sense resistor, and a second terminal, the comparator controlling the first terminal of the first control switch to connect to the second terminal of the first control switch when the adapter is at a little traffic state, the comparator controlling the first terminal of the first control switch to disconnect to the second terminal of the first control switch when the adapter is at a fully loaded state;
  a voltage converter connected to the second terminal of the first control switch, the voltage converter receiving the voltage from the adapter and converting the received voltage when the first terminal of the first control switch is connected to the second terminal of the first control switch;
  an output interface connected to the sense resistor, to connect to an electronic device, to provide the voltage from the adapter to the electronic device; and
  a plurality of output ports connected to the voltage converter, to provide the converted voltage from the voltage converter to electronic devices connected to the plurality of output ports.

2. The voltage converting apparatus as claimed in claim 1, further comprising a plurality of protecting switches, wherein each of the plurality of protecting switches is connected between the voltage converter and a corresponding output port, the plurality of protecting switches are cut off when the converted voltage of the voltage converter is in an overvoltage state.

3. The voltage converting apparatus as claimed in claim 1, further comprising a charging circuit, a button switch, a charging interface, and a storage battery, wherein an input terminal of the charging circuit is connected to the second terminal of the first control switch, an output terminal of the charging circuit is connected to the charging interface and the storage battery via the button switch, when the first terminal of the first control switch is connected to the second terminal of the first control switch and the button switch is pressed, the charging circuit charges an electronic device connected to the charging interface and charging the storage battery.

4. The voltage converting apparatus as claimed in claim 3, further comprising a second control switch, wherein the second control switch comprising a first terminal connected to the voltage converter, a second terminal connected to the storage battery, and a control terminal connected to the output terminal of the comparator, the comparator controls the first terminal of the second control switch to connect to the second terminal of the second control switch when the adapter is at a little traffic state, and controls the first terminal of the second control switch to disconnect to the second terminal of the second control switch when the adapter is at a fully loaded state, wherein the storage battery outputs a voltage to the voltage converter when the first terminal of the second control switch is connected to the second terminal of the second control switch, the voltage converter receives the voltage from the storage battery and provides the converted voltage to the plurality of output ports.

5. The voltage converting apparatus as claimed in claim 4, further comprising a plurality of indicators connected to the storage battery, to indicate charge of the storage battery.

6. The voltage converting apparatus as claimed in claim 5, further comprising a main body, wherein the input interface, the output interface, the plurality of output ports, the charging interface, the plurality of indicators, the plurality of power switches, and the button switch are set on a surface of the main body.

7. The voltage converting apparatus as claimed in claim 6, wherein the converted voltage comprises a 5 volt (V) output and a 12V output, the plurality of output ports comprises three universal serial bus interfaces, a 5V output interface, and a 12V output interface.

8. The voltage converting apparatus as claimed in claim 7, wherein the voltage converter is a direct current voltage converter, the plurality of protecting switches are resettable fuses.

\* \* \* \* \*